United States Patent [19]

Ohtake

[11] Patent Number: 5,757,889

[45] Date of Patent: May 26, 1998

[54] VOICE MONITORING METHOD FOR A TELEPHONE SWITCHING EQUIPMENT

[75] Inventor: Kiyomi Ohtake, Tokyo, Japan

[73] Assignee: NEC Corporation, Tokyo, Japan

[21] Appl. No.: 582,582

[22] Filed: Jan. 3, 1996

[30] Foreign Application Priority Data

Jan. 11, 1995 [JP] Japan .................... 7-002494

[51] Int. Cl.$^6$ .................... H04M 1/24; H04M 3/08; H04M 3/22
[52] U.S. Cl. .................... 379/34; 379/12; 379/35; 379/265
[58] Field of Search .................... 379/1, 9, 10, 15, 379/16, 17, 20, 22, 27, 29, 34, 101, 156, 158, 166, 201, 215, 207, 212, 213, 214, 98, 95, 93, 106, 107, 211, 265, 266, 309, 208, 218

[56] References Cited

U.S. PATENT DOCUMENTS

| | | | |
|---|---|---|---|
| 4,419,753 | 12/1983 | Kojima et al. | 379/201 |
| 4,446,554 | 5/1984 | Webber | 379/201 |
| 4,575,839 | 3/1986 | Ogata et al. | 379/34 |
| 5,101,425 | 3/1992 | Darland et al. | 379/265 |
| 5,535,256 | 7/1996 | Maloney et al. | 379/265 |
| 5,539,814 | 7/1996 | Shoji | 379/215 |
| 5,577,112 | 11/1996 | Cambray et al. | 379/265 |
| 5,604,796 | 2/1997 | Yamazaki | 379/201 |

Primary Examiner—Curtis Kuntz
Assistant Examiner—Binh K. Tieu
Attorney, Agent, or Firm—Young & Thompson

[57] ABSTRACT

A voice monitoring method which is capable of preventing an occurrence of the interruption of a call and reducing the burden of switching software, and also capable of monitoring the contents of a call whose communication path is performed within the same line switch installed in a remote place is provided. A voice from a monitored subscriber telephone set 6-1 is distributed at a line switch 4-1 to a voice monitor path (unidirectional path) 8-1, and a voice from a subscriber telephone set 6-2 of the other party is distributed at the line switch 4-1 to a voice monitor path (unidirectional path) 8-2. The distributed voices are given through a time-division switch 3 to the first and second terminals of a three-way trunk 5, are mixed at the three-way trunk 5, and are sent through the third terminal to a monitor telephone set 7.

4 Claims, 4 Drawing Sheets

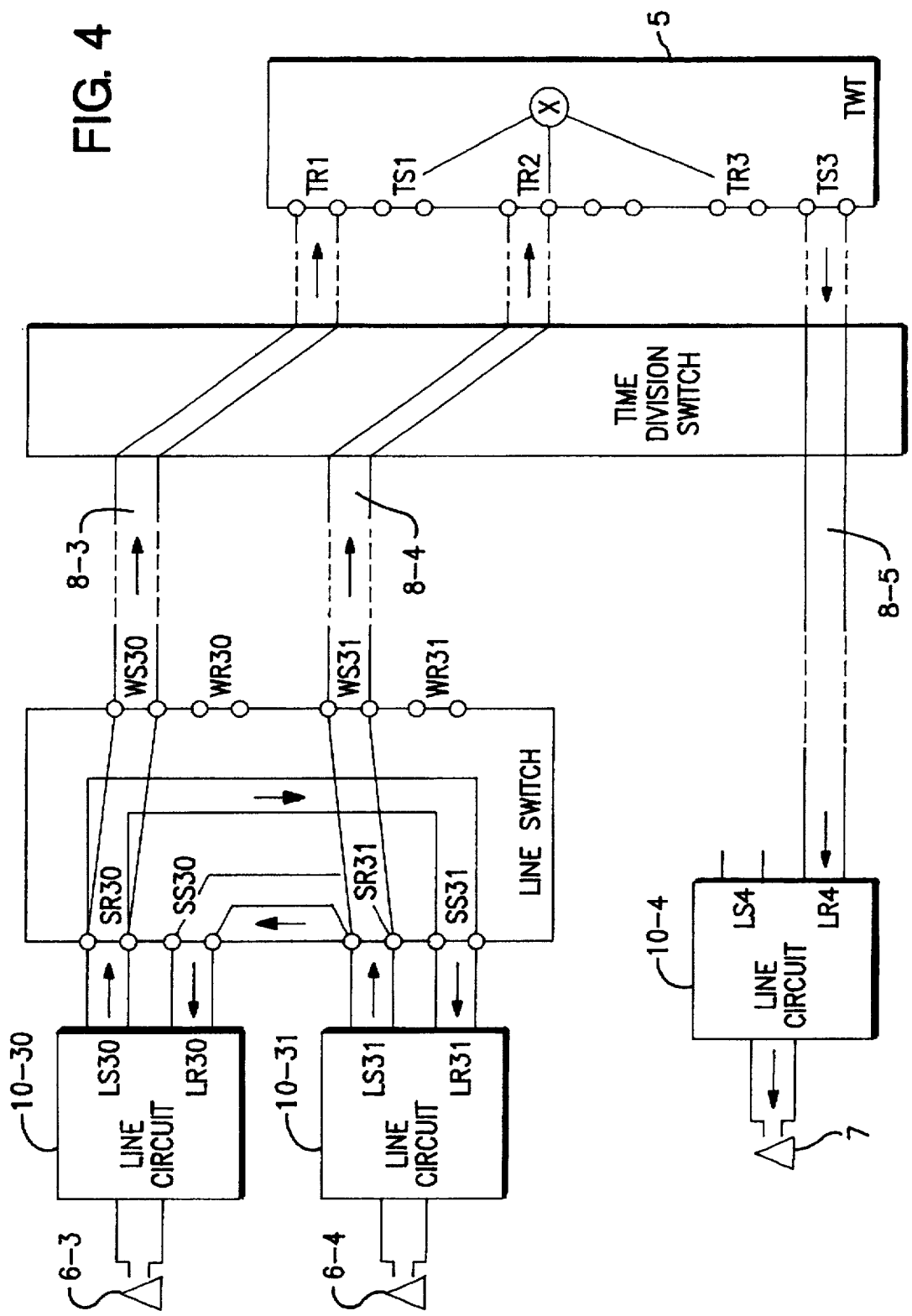

VOICE MONITORING METHOD FOR A TELEPHONE SWITCHING EQUIPMENT

BACKGROUND OF THE INVENTION

1. Field of the Invention

The present invention relates to a voice monitoring method for a telephone switching equipment, and more particularly, to a voice monitoring method which specifies a subscriber to be monitored and establishes monitoring paths to the subscriber without interruption of a speech path being used for communication between the subscriber and the other party.

2. Description of the Related Art

FIG. 1 is a block diagram showing an essential part of a telephone switching equipment adopting a conventional voice monitoring method which is disclosed in Japanese Patent Application Laid-Open No. 64-81447 as an example.

In this figure, reference numeral 1 is a central control unit for controlling entire operation of the telephone switching equipment, 2 an operation and maintenance terminal unit (O&M terminal unit) for man-machine interface purposes, and 3 a time-division switch (TDSW) for establishing communication paths, 4-1, 4-2, 4-4, and 4-5 are line switches (LSW) for connecting and concentrating subscriber's lines, 5 is a three-way trunk (TWT) for three-waty communication purpose, 6-1 and 6-2 are subscriber telephone sets, and 7 is a monitor telephone set.

In the conventional voice monitoring method, when a voice monitoring for a subscriber telephone set 6-1 is required, a subscriber telephone set 6-1 is specified as a telephone set to be monitored and a monitoring connection is requested by an O&M terminal unit 2. As the result of the request, the central control unit 1 establishes a connection path through the three-way trunk 5 for a subscriber telephone set 6-1 and a subscriber telephone set 6-2 which have been directly connected in the time-division switch 3.

In this connection, the subscriber telephone set 6-1 is connected to a first terminal of the three-way trunk 5, the subscriber telephone set 6-2 of the other party is connected to a second terminal of the three-way trunk 5 and the monitor telephone set 7 is connected to a third terminal of the three-way trunk 5. With this, the voice from the subscriber telephone set 6-1 and the voice from the subscriber telephone set 6-2 are mixed at the three-way trunk 5 and are sent through the third terminal of the three-way trunk 5 to a monitor telephone set 7.

However, in a conventional voice monitoring method such as this, since the connection path between the subscriber telephone sets 6-1 and 6-2 is switched over to the connection path through the three-way trunk 5, interruption of communication occurs.

And also, since the connection path on the time-division switch 3 is connected directly to the three-way trunk 5, the necessity of changing a connection of the path on the time-division switch 3 for other telephone services, e.g. a call transfer service, a call waiting service etc., has to be judged each time the state of a call changes. For this reason, the processing of programs in the central control unit 1 for controlling a call process and for controlling a monotoring process become very complicated, and consequently, the switching software as a whole suffers a large burden.

Further, there is a problem for a call which is performed within a remote switching unit (not shown) connected to the telephone switching equipment through a line switch. Because the connecting path on the time-division switch 3 is not established, there is no way to provide a monitoring connection for such a call.

SUMMARY OF THE INVENTION

The present invention has been made in order to solve such problems, and the objective of the invention is to provide a voice monitoring method which is capable of preventing an occurrence of the interruption of a call and reducing the burden of switching software and also which is capable of monitoring the contents of a call whose communication path is performed within the same line switch installed in a remote place.

To achieve an objective such as this, a voice monitoring method according to the present invention for a telephone switching equipment, which includes a time-division switch for establishing communication paths, a plurality of line switches being connected to the time-division switch for connecting and concentrating a plurality of subscriber telephone sets, and at least one three-way trunk being connected to the time-division switch for providing three-waty communication paths, comprises the following steps of:

(1) distributing a voice from a monitored subscriber telephone set and a voice to the monitored subscriber telephone set at the line switch;

(2) giving both the distributed voices through the time-division switch to first and second terminals of the three-way trunk for mixing voices; and (3) giving mixed voice from a third terminal of the three-way trunk to a monitoring telephone set through the time-division switch.

According to the present invention, a voice from a monitored subscriber telephone set and a voice to the monitored subscriber telephone set are distributed at the line switch by connecting unidirectional paths for monitoring to each of terminals of the line switch appearing such voices, both the distributed voices are given to first and second terminals of the three-way trunk through the monitoring paths and mixed, and the mixed voices are transmitted from a third terminal of the three-way trunk to the monitoring telephone set. Therefore, the monitoring paths are connected at the line switch.

BRIEF DESCRIPTION OF THE DRAWINGS

FIG. 4 is a block diagram showing path connections for voice monitoring in the case where the monitoring is performed for the subscriber telephone set which is connected to the line switch being provided in a remote place.

DETAILED DESCRIPTION OF THE PREFERRED EMBODIMENTS

The present invention will be described in the following by referring to the attached drawings.

Figure 1:
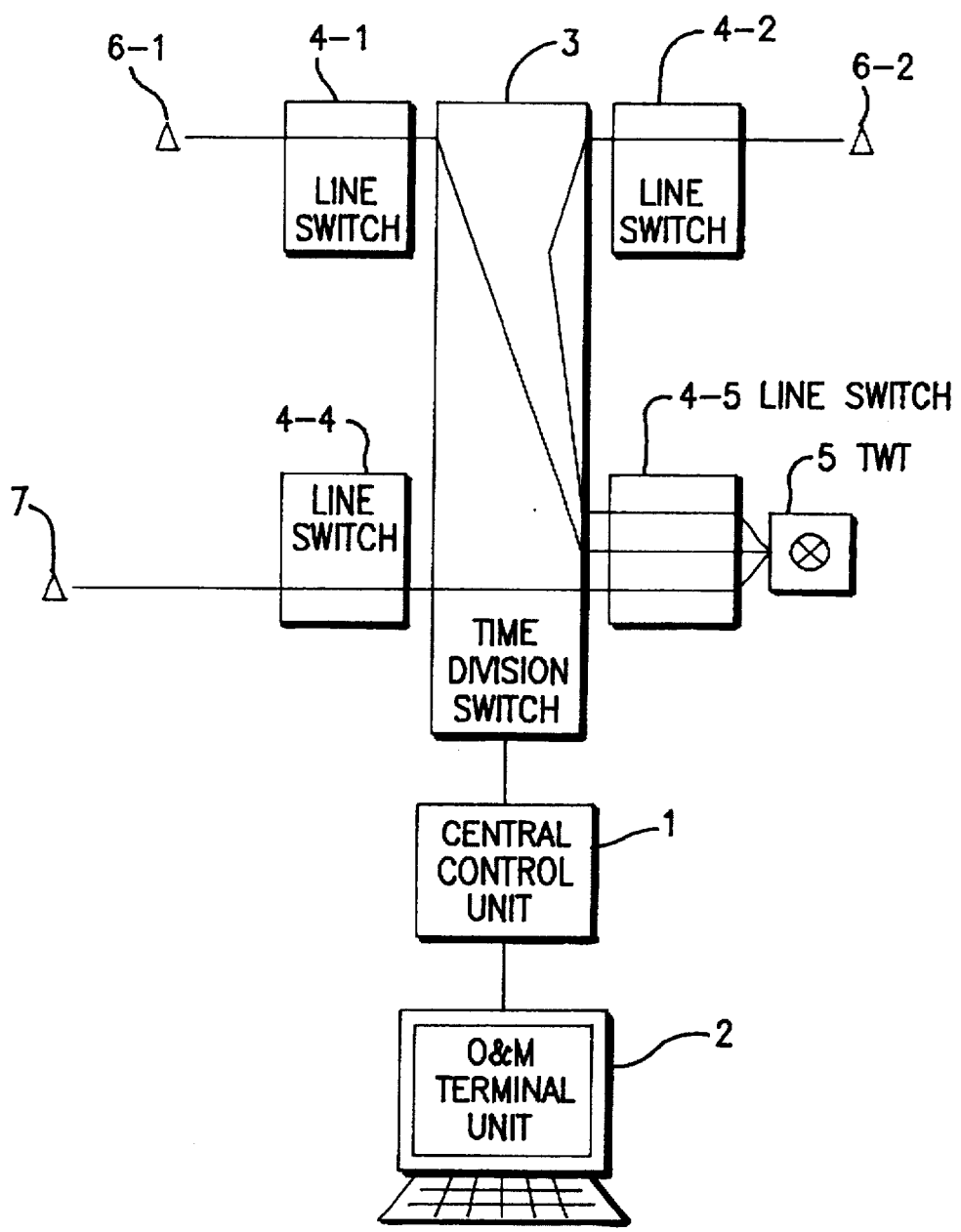
FIG. 1 is a block diagram showing an essential part of a telephone switching equipment adopting a conventional voice monitoring method.
Figure 2:
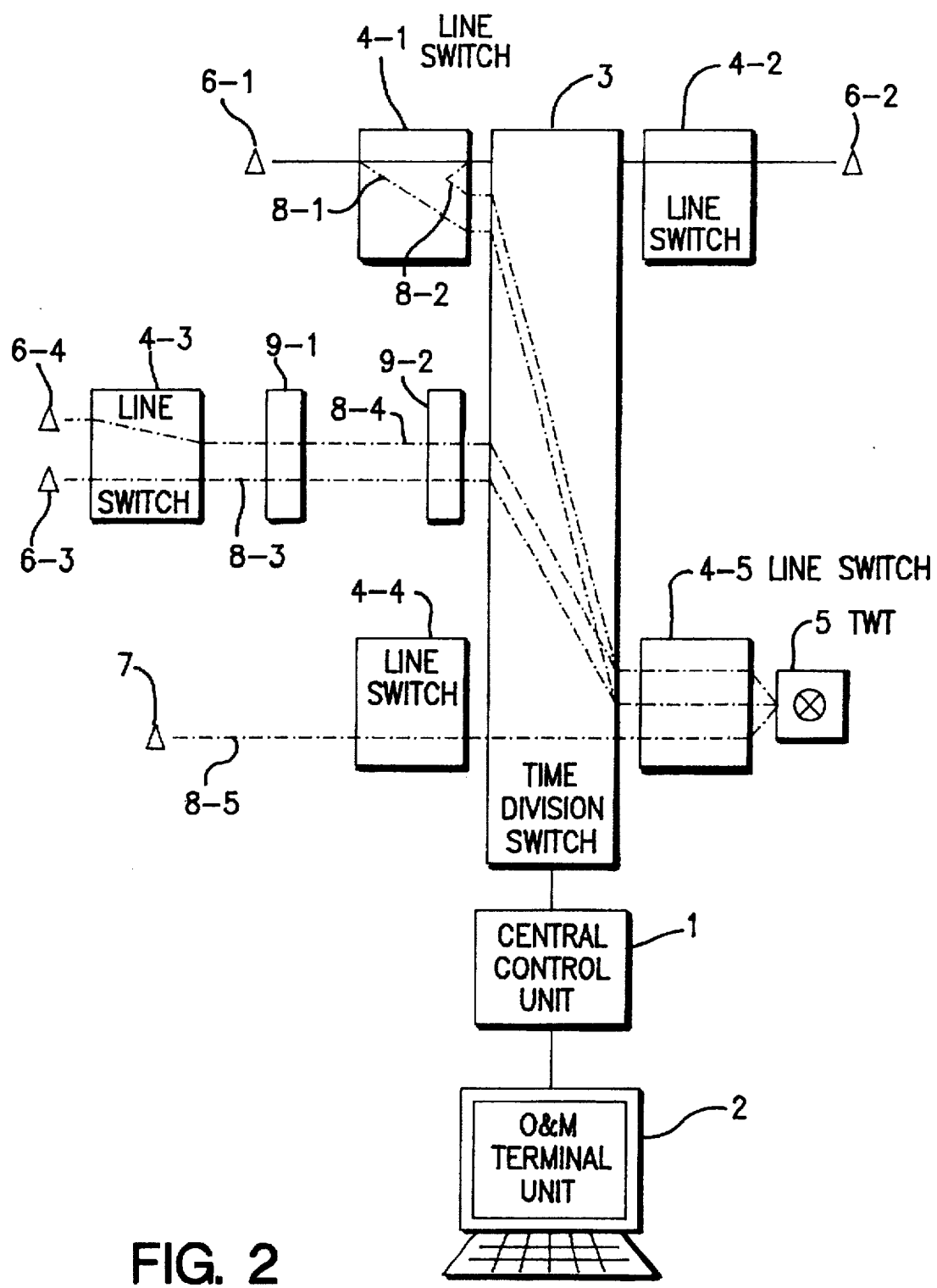
FIG. 2 is a block diagram showing an essential part of a telephone switching equipment adopting a voice monitoring method of the present invention.

FIG. 2 is a block diagram showing an essential part of a telephone switching equipment adopting a voice monitoring method of the present invention.

In this figure, reference numeral 1 is a central control unit, 2 an O&M terminal unit, and 3 a time-division switch (TDSW), 4-1 to 4-5 are line switches (LSW), and among those line switches, the line switch 4-3 is provided especially for a remote switching equipment located in the defferent place from this telephone switching equipment. 5 is a three-way trunk (TWT), 6-1 to 6-4 are subscriber telephone sets, 7 is a monitor telephone set, 8-1 to 8-5 are voice monitoring paths, and 9-1 and 9-2 are transmission units connecting the line switch 4-3 as a remote switching equipment to the time-division switch 5 of this telephone switching equipment.

FIG. 2 shows two cases of voice monitoring method in one drawing. One is the case (case 1) where the monitoring is performed for the subscriber telephone set 6-1 which is connected to the line switch 4-1, and another is the case (case 2) where the monitoring is performed for the subscriber telephone set 6-3 which is connected to the line switch 4-3. In each case, monitoring paths 8-1 and 8-2, or 8-3 and 8-4, are added to an ordinary communication path between subscriber telephone sets 6-1 and 6-2, or 6-3 and 6-4, instead of reconnection of the communication path performed by the conventional monitoring method.

Figure 3:
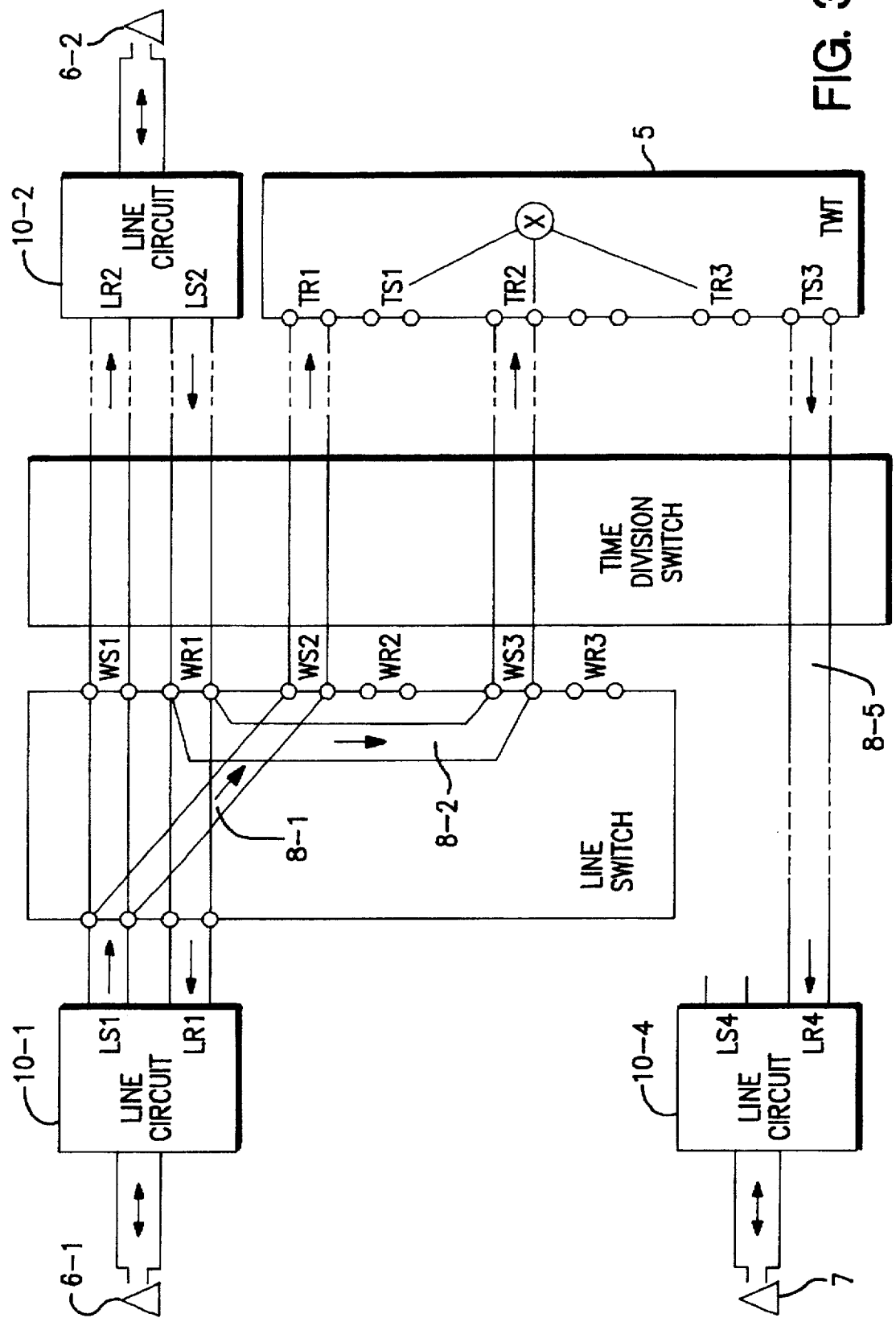
FIG. 3 is a block diagram showing path connections for voice monitoring in the case where the monitoring is performed for the subscriber telephone set which is connected to the line switch being provided in this telephone switching equipment.

FIG. 3 is a block diagram showing path connections for voice monitoring in the case 1. In a telephone switching equipment, a communication path is provided with four wires configuration, two wires each for a signal sending direction path and a signal receiving direction path. A subscriber line which is two wires configuration is connected to a line circuit at the telephone switching equipment, and two wires/four wires conversion is performed in the line circuit. Therefore, a signal sending path and a signal receiving path are separated each other in the telephone switching equipment. In FIG. 3, 10-1, 10-2 and 10-4 are line circuits for connecting telephone sets 6-1, 6-2 and 7 respectively.

In this monitoring method, when the subscriber telephone set 6-1 is specified as a monitored telephone set by the O&M terminal unit 2 (not shown in FIG. 3), the central control unit 1 (not shown in FIG. 3) seizes the three-way trunk 5 and controls the time-division switch 3 and the line switch 4-1 to establish the voice monitoring path 8-1 which is one directional path for receiving signal from the subscriber telephone set 6-1, and connects the voice monitoring path 8-1 to a first receiving terminal TR1 of the three-way trunk 5. The central control unit 1 also controls the time-division switch 3 and the line switch 4—4 (not shown in FIG. 3) to establish the voice monitoring path 8-5 which is one directional path for sending signal to the monitoring telephone set 7, and connects the voice monitoring path 8-5 to a third sending terminal TS3 of the three-way trunk 5.

If the monitored subscriber telephone set 6-1 is engaged in a telephone call to other party, then the central control unit 1 controls the time-division switch 3 and the line switch 4-1 to establish the voice monitoring path 8-2 which is one directional path for receiving signal from the subscriber telephone set 6-2 which is the other party of the call, and connects the voice monitoring path 8-2 to a second receiving terminal TR2 of the three-way trunk 5.

With these connection arrangements shown in FIG. 3, the voice monitoring path 8-1 is connecting the terminal SR1 of the line switch 4-1, at which sending signal from telephone set 6-1 appears, to the terminal TR1 of the three-way trunk 5, the voice monitoring path 8-2 is connecting the terminal WR1 of the line switch 4-1, at which sending signal from telephone set 6-2 appears, to the terminal TR2 of the three-way trunk 5, and the voice monitoring path 8-5 is connecting the terminal TS3 of the three-way trunk 5, at which mixed signal of sending signals from telephone sets 6-1 and 6-2 appears, to the terminal LR4 of the line circuit 10-4.

Therefore, the distributed voices from the telephone sets 6-1 and 6-2 at the line switch 4-1 are given through the time-division switch 3 to the first and second terminals (TR1 and TR2) of the three-way trunk 5, are mixed at the three-way trunk 5, and are sent through the third terminal (TS3) to the monitor telephone set 7.

In this monitoring method, the interruption of a communication path does not occur because the change over of a communication path in the time-division switch 3 is not performed, but, only the monitoring paths are added to a communication path in the line switch 4-1.

Now, for instance, even if the call transfer service is activated by the subscriber telephone set 6-2, only the call path in the time-division switch 3 is operated and reestablished for new call corresponding to the activated service, but the monitoring is continued while the voice monitoring paths 8-1 and 8-2 in the line switch 4-1 remain unchanged. With this, the processing of programs in the central control unit 1 for controlling a call process and for controlling a monotoring process become simple and the burden of the switching software is thus lightened.

FIG. 4 is a block diagram showing path connections for voice monitoring in the case 2. In FIG. 4, 10-30, 10-31 and 10-4 are the line circuits for connecting telephone sets 6-3, 6-4 and 7 respectively at this telephone switching equipment. The central control unit 1, the O&M terminal unit 2, line switches 4—4 and 4-5, and the transmission equipment 9-1 and 9-2 are omitted in FIG. 4 for making the drawing to be simple.

In this monitoring method, when the subscriber telephone set 6-3 is specified as a monitored telephone set by the O&M terminal unit 2, the central control unit 1 seizes the three-way trunk 5 and controls the time-division switch 3 and the line switch 4-3 to establish the voice monitoring path 8-3 which is one directional path for receiving signal from the subscriber telephone set 6-3, and connects the voice monitoring path 8-3 to a first receiving terminal TR1 of the three-way trunk 5. The central control unit 1 also controls the time-division switch 3 and the line switch 4—4 to establish the voice monitoring path 8-5 which is one directional path for sending signal to the monitoring telephone set 7, and connects the voice monitoring path 8-5 to a third sending terminal TS3 of the three-way trunk 5.

If the monitored subscriber telephone set 6-3 is engaged in a telephone call to other party within the line switch 4-3 as shown in this figure, then the central control unit 1 controls the time-division switch 3 and the line switch 4-3 to establish the voice monitoring path 8-4 which is one directional path for receiving signal from the subscriber telephone set 6-4 which is the other party of the call, and connects the voice monitoring path 8-4 to a second receiving terminal TR2 of the three-way trunk 5.

With these connection arrangements shown in FIG. 4, the voice monitoring path 8-3 is connecting the terminal SR30 of the line switch 4-3, at which sending signal from telephone set 6-3 appears, to the terminal TR1 of the three-way trunk 5, the voice monitoring path 8-4 is connecting the terminal SR31 of the line switch 4-3, at which sending signal from telephone set 6-4 appears, to the terminal TR2 of the three-way trunk 5, and the voice monitoring path 8-5 is connecting the terminal TS3 of the three-way trunk 5, at which mixed signal of sending signals from telephone sets 6-3 and 6-4 appears, to the terminal LR4 of the line circuit 10-4.

Therefore, the distributed voices from the telephone sets 6-3 and 6-4 at the line switch 4-3 are given through the transmission equipment 9-1 and 9-2, and the time-division switch 3 to the first and second terminals (TR1 and TR2) of the three-way trunk 5, are mixed at the three-way trunk 5, and are sent through the third terminal (TS3) to the monitor telephone set 7.

Therefore, even if the call between the subscriber telephone sets 6-3 and 6-4 is performed by connecting a path within the same line switch 4-3 installed in a remote place without being passed through the time-division switch 3, the voice monitoring is available by adding monitoring paths 8-3 and 8-4 via the transmission equipment 9-1 and 9-2 and through the time-division switch 3 to the three-way trunk 5.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therin.

What is claimed is:

1. A voice monitoring method for a telephone switching equipment including a time-division switch for establishing communication paths, a plurality of line switches being connected to the time-division switch for connecting and concentrating a plurality of subscriber telephone sets, and at least one three-way trunk being connected to the time-division switch for providing three-way communication paths, said method comprising steps of:

distributing a voice from a monitored subscriber telephone set and a voice to said monitored subscriber telephone set at said line switch;

giving both the distributed voices through said time-division switch to first and second terminals of said three-way trunk for mixing said distributed voices; and giving said mixed voices from a third terminal of said three-way trunk to a monitoring telephone set through said time-division switch.

2. A voice monitoring method for a telephone switching equipment including a time-division switch for establishing communication paths, a plurality of line switches being connected to the time-division switch for connecting and concentrating a plurality of subscriber telephone sets, and at least one three-way trunk being connected to the time-division switch for providing three-way communication paths, said method comprising steps of:

connecting a first monitoring path having one directional signal transmission characteristics to a signal receiving terminal from a monitored telephone set at a first line switch;

connecting another end of said first monitoring path to a first signal receiving terminal of said three-way trunk through said time-division switch;

connecting a second monitoring path having one directional signal transmission characteristics to a signal sending terminal to a monitoring telephone set at a second line switch; and connecting another end of said second monitoring path to a third signal sending terminal of said three-way trunk through said time-division switch.

3. A voice monitoring method for a telephone switching equipment according to claim 2, further comprising steps of:

connecting a third monitoring path having one directional signal transmission characteristics to a signal receiving terminal from a telephone set connected with said monitored telephone set at a first line switch;

connecting another end of said first monitoring path to a second signal receiving terminal of said three-way trunk through said time-division switch.

4. A voice monitoring method for a telephone switching equipment according to claim 3, wherein, said first line switch is remotely located and connected to said time-division switch through transmission equipment.

\* \* \* \* \*